(12) United States Patent
Dziubinschi et al.

(10) Patent No.: US 11,254,236 B2
(45) Date of Patent: Feb. 22, 2022

(54) HIGH PERFORMANCE UNIFORM TEMPERATURE COLD PLATE

(71) Applicant: Hanon Systems, Daejeon (KR)

(72) Inventors: Orest Alexandru Dziubinschi, Dearborn, MI (US); Qiong Zhang, Royal Oak, MI (US); Nithin Reddy Karna, West Bloomfield, MI (US)

(73) Assignee: HANON SYSTEMS, Daejeon (KR)

( * ) Notice: Subject to any disclaimer, the term of this patent is extended or adjusted under 35 U.S.C. 154(b) by 263 days.

(21) Appl. No.: 16/663,456

(22) Filed: Oct. 25, 2019

(65) Prior Publication Data

US 2021/0122263 A1     Apr. 29, 2021

(51) Int. Cl.
| | | |
|---|---|---|
| *H01M 10/613* | (2014.01) | |
| *H01M 10/625* | (2014.01) | |
| *H01M 10/6554* | (2014.01) | |
| *H01M 10/6556* | (2014.01) | |
| *B60L 58/26* | (2019.01) | |
| *B60H 1/32* | (2006.01) | |

(52) U.S. Cl.
CPC ........... *B60L 58/26* (2019.02); *H01M 10/613* (2015.04); *H01M 10/625* (2015.04); *H01M 10/6554* (2015.04); *H01M 10/6556* (2015.04); *B60H 2001/3242* (2013.01)

(58) Field of Classification Search
CPC .............. B60L 58/26; B60L 2240/545; H01M 10/6556; H01M 10/625; H01M 10/6554; H01M 10/613; B60H 2001/3242; Y02E 60/10; Y02T 10/70
See application file for complete search history.

(56) References Cited

U.S. PATENT DOCUMENTS

| | | |
|---|---|---|
| 8,297,343 B2 | 10/2012 | Yang |
| 2007/0119579 A1 | 5/2007 | Richter |
| 2011/0262794 A1* | 10/2011 | Yoon .................... H01M 10/486 429/120 |
| 2012/0107663 A1* | 5/2012 | Burgers .............. H01M 10/643 429/120 |
| 2012/0122003 A1 | 5/2012 | Nam et al. |
| 2013/0108902 A1* | 5/2013 | Kristofek ............ H01M 10/625 429/72 |
| 2014/0194049 A1 | 7/2014 | Kumagai et al. |
| 2015/0140366 A1 | 5/2015 | Nicholls |
| 2015/0140388 A1 | 5/2015 | Harada et al. |
| 2015/0191101 A1* | 7/2015 | Rawlinson ......... B60H 1/00278 429/62 |
| 2016/0204486 A1* | 7/2016 | Kenney ............. H01M 10/6556 429/120 |
| 2017/0077565 A1 | 3/2017 | Burrows et al. |
| 2019/0379014 A1* | 12/2019 | Jeon ...................... H01M 50/20 |
| 2021/0254895 A1* | 8/2021 | Vakilimoghaddam ........................ H01M 10/6556 |

FOREIGN PATENT DOCUMENTS

| | | |
|---|---|---|
| EP | 2945217 A1 | 11/2015 |
| KR | 20120059031 A | 6/2012 |
| KR | 20180131015 A | 12/2018 |

* cited by examiner

*Primary Examiner* — Muhammad S Siddiquee
(74) *Attorney, Agent, or Firm* — Shumaker, Loop & Kendrick, LLP; James D. Miller

(57) ABSTRACT

A cold plate assembly for cooling a battery of a vehicle includes a first exterior portion disposed adjacent the battery, a separator portion disposed adjacent the first exterior portion, a first flow path formed between the first exterior portion and the separator portion with the first flow path configured to receive a first fluid flow therein, a second exterior portion disposed adjacent the separator portion opposite the first exterior portion, and a second flow path formed between the separator portion and the second exterior portion with the second flow path configured to receive a second fluid flow therein. The first fluid flow flows relative to the second fluid flow in a counter-flow flow configuration.

14 Claims, 7 Drawing Sheets

HIGH PERFORMANCE UNIFORM TEMPERATURE COLD PLATE

FIELD OF THE INVENTION

The present invention relates to a cold plate assembly for use with a battery assembly of a motor vehicle, and more particularly, a cold plate assembly having fluid flow paths formed therein for establishing a counter-flow flow configuration between at least two different fluid flows passing through the cold plate assembly.

BACKGROUND OF THE INVENTION

Electric vehicles and hybrid electric vehicles typically include battery assemblies for generating the power necessary to drive the associated vehicle when the associated electric drive mechanism is engaged. The batteries forming such assemblies tend to generate significant heat during operation or charging thereof, and especially during a fast charging operation associated with such batteries. It is therefore important to continuously remove heat from each of the batteries in order to maintain each of the batteries within a desired temperature range. It is accordingly desirable to cool such battery assemblies during operation or charging thereof to avoid the generation of excessive heat within the battery assemblies or adjacent components of the vehicle.

One method of cooling the batteries forming the associated battery assembly includes placing what is commonly referred to as a "cold plate" in heat exchange relationship with one or more of the batteries, wherein the cold plate forms a heat sink having suitable properties of thermal conduction for removing heat from the batteries. Such cold plates may also typically include a fluid flow path formed therein, wherein the fluid flow path conveys a fluid therethrough for further removing heat from the cold plate and hence the associated batteries in contact with the cold plate. However, such cold plates tend to dissipate the heat from the batteries in a non-uniform manner due to the manner in which the fluid flow continuously warms as it draws heat from the batteries, thereby causing portions of the batteries and the associated cold plate to have variable temperatures. This non-uniform heat dissipation may cause portions of the batteries to overheat or may cause localized deformations within the batteries or the cold plate as a result of non-uniform thermal expansion.

There accordingly exists a need in the art for a cold plate assembly having a greater heat exchange efficiency and more homogeneous heat transfer therethrough for more effectively and efficiently cooling the batteries of the associated battery assembly.

SUMMARY OF THE INVENTION

Compatible and attuned with the present invention, an improved cold plate assembly utilizing a counter-flow flow configuration for achieving increased and more uniform heat transfer from a battery to the cold plate assembly has surprisingly been discovered.

According to an embodiment of the invention, a cold plate assembly for cooling a battery of a vehicle includes a first exterior portion disposed adjacent the battery, a separator portion disposed adjacent the first exterior portion, a first flow path formed between the first exterior portion and the separator portion with the first flow path configured to receive a first fluid flow therein, a second exterior portion disposed adjacent the separator portion opposite the first exterior portion, and a second flow path formed between the separator portion and the second exterior portion with the second flow path configured to receive a second fluid flow therein. The first fluid flow flows relative to the second fluid flow in a counter-flow flow configuration.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
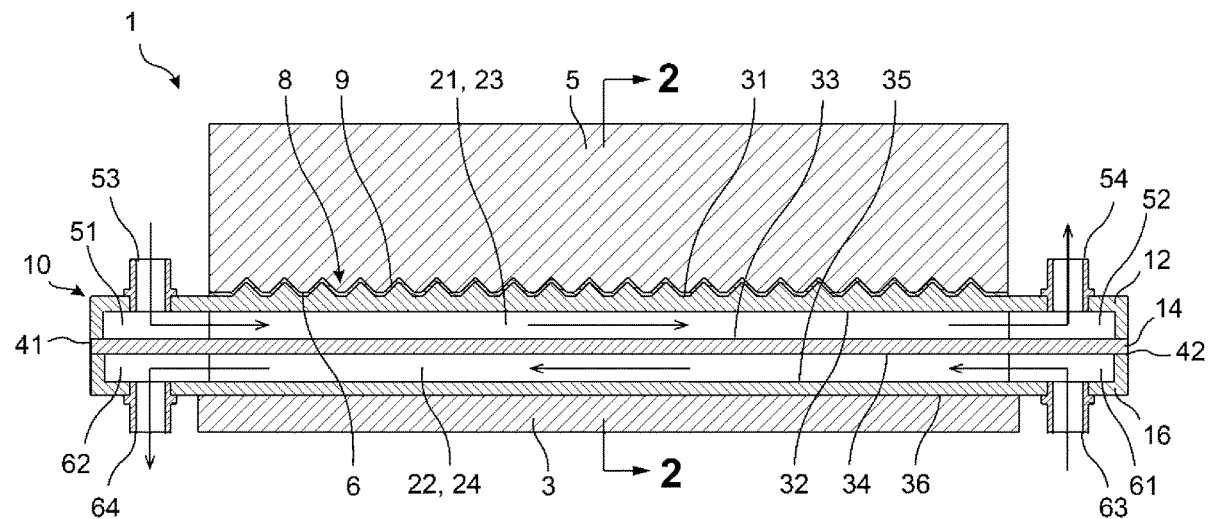
FIG. 1 is a cross-sectional elevational view of a battery cooling assembly according to an embodiment of the present invention, wherein the battery cooling assembly includes a counter-flow flow configuration present between a first fluid flow and a second fluid flow isolated from the first fluid flow within the battery cooling assembly.
Figure 2:
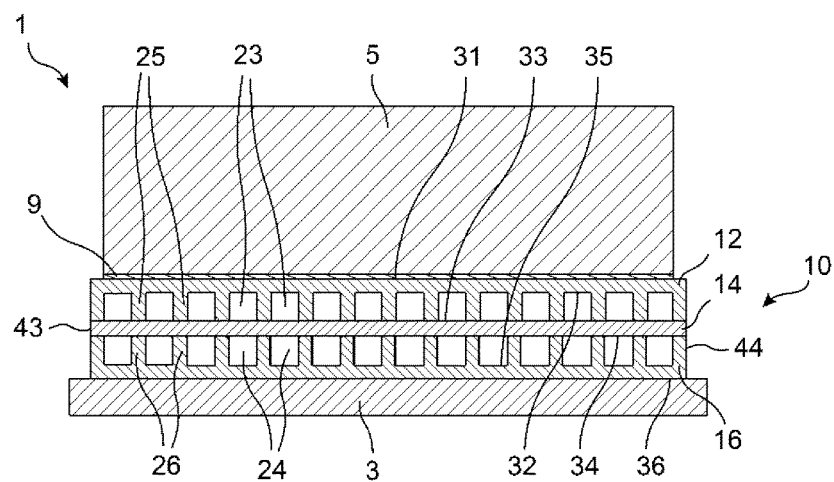
FIG. 2 is a cross-sectional elevational view of the battery cooling assembly as taken through section lines 2-2 of FIG. 1.

FIGS. 1 and 2 illustrate a battery cooling assembly 1 according to an embodiment of the present invention. The battery cooling assembly 1 is configured to remove heat from a battery 5 associated with providing power to a motor vehicle, such as an electric or hybrid electric vehicle. The battery 5 may provide power to any associated drive mechanisms or other components associated with operation of the corresponding vehicle, as desired. The battery 5 may be any type of battery suitable for such applications and capable of generating heat, including lead-acid batteries, nickel-cadmium batteries, nickel-metal hydride batteries, or lithium-ion batteries, as non-limiting examples.

The battery cooling assembly 1 may be utilized to cool the battery 5 during operation of the associated vehicle or during a charging session of the battery 5, as desired. More specifically, many batteries 5 used in automotive applications are configured for being cooled during what is commonly referred to as a "fast charging" process wherein an elevated current is applied to the battery 5 to decrease the amount of time necessary for fully recharging the battery 5. Such fast charging sessions tend to cause the associated battery 5 to produce an increased amount of heat in comparison to a traditional charging session, hence the battery cooling assembly 1 disclosed herein may be especially useful in removing heat from the battery 5 during such a fast charging session.

The battery cooling assembly 1 includes the battery 5 and a cold plate assembly 10. The battery cooling assembly 1 is also shown adjacent and coupled to a static structure 3 of the associated vehicle, which may be any substantially stationary component or structure of the vehicle to which the battery cooling assembly 1 may be directly or indirectly coupled. The static structure 3 may be a portion of a structural frame of the vehicle, as one non-limiting example. The battery cooling assembly 1 may be coupled to the static structure 3 using any desired coupling method, including the use of threaded fasteners or aggressive metal joining methods such as welding or brazing, as desired.

The cold plate assembly 10 includes at least a first exterior portion 12, a separator portion 14, and a second exterior portion 16, each of which are substantially planar in configuration and arranged substantially parallel to each other. The first exterior portion 12 is provided adjacent the battery 5, the separator portion 14 is provided adjacent the first exterior portion 12, and the second exterior portion 16 is provided adjacent the separator portion 14. The battery 5 and the planar extensions of each of the identified portions 12, 14, 16 are spaced from each other with respect to a height direction of the cold plate assembly 10. In the provided embodiment, each of the portions 12, 14, 16 includes a substantially rectangular perimeter shape. The rectangular perimeter shape of the cold plate assembly 10 is defined by a first side 41, an oppositely arranged second side 42, a third side 43 connecting the first side 41 to the second side 42, and a fourth side 44 arranged opposite the third side 43 and also connecting the first side 41 to the second side 42. The first side 41 and the second side 42 may be arranged to extend in a width direction of the cold plate assembly 10 while the third side 43 and the fourth side 44 may be arranged to extend in a longitudinal direction of the cold plate assembly 10. Alternatively, the first side 41 and the second side 42 may be arranged to extend in the longitudinal direction of the cold plate assembly 10 while the third side 43 and the fourth side 44 may be arranged to extend in the width direction of the cold plate assembly 10, as desired. The sides 41, 42, 43, 44 of the cold plate assembly 10 are illustrated in FIGS. 1 and 2 as being formed by the cooperation of inwardly projecting and peripherally extending wall structures of each of the first exterior portion 12 and the second exterior portion 16 as well as a peripheral region of the separator portion 14. However, the sides 41, 42, 43, 44 may alternatively be formed by independently provided wall structures (not shown) extending around the periphery of each of the portions 12, 14, 16 without necessarily departing from the scope of the present invention. In any event, the sides 41, 42, 43, 44 of the cold plate assembly 10 are configured to delimit a flow of any fluid or fluids passing through the cold plate assembly 10 with respect to the perimeter of the cold plate assembly 10.

The first exterior portion 12 includes a first major surface 31 and an oppositely arranged second major surface 32, the separator portion 14 includes a first major surface 33 and an oppositely arranged second major surface 34, and the second exterior portion 16 includes a first major surface 35 and an oppositely arranged second major surface 36, wherein each of the major surfaces 31, 32, 33, 34, 35, 36 are substantially planar in configuration while extending primarily in the width and longitudinal directions of the cold plate assembly 10. The identified major surfaces 31, 32, 33, 34, 35, 36 are also arranged substantially parallel to each other. The first major surface 31 of the first exterior portion 12 faces the battery 5 while the second major surface 32 of the first exterior portion 12 faces towards the first major surface 33 of the separator portion 14. The second major surface 34 of the separator portion 14 faces towards the first major surface 35 of the second exterior portion 16 while the second major surface 36 of the second exterior portion 16 faces in a direction away from the battery 5 and towards the underlying static structure 3.

The portions 12, 14, 16 of the cold plate assembly 10 may be provided as any thermally conductive material suitable for interacting with the fluid or fluids conveyed through the cold plate assembly 10, as described in greater detail hereinafter. The portions 12, 14, 16 may accordingly be formed from a metallic material, such as aluminum and alloys thereof. However, one skilled in the art will appreciate that other thermally conductive materials may be used to form the cold plate assembly 10 without necessarily departing from the scope of the present invention.

The battery 5 includes a heat exchange surface 6 formed by an outwardly disposed surface of the battery 5 through which heat is transferred to the cold plate assembly 10 by means of thermal conduction. The heat exchange surface 6 may be provided as any desired material suitable for conducting the heat from the battery 5 while also protecting and isolating the internal structures of the battery 5, depending on the type of battery 5 used.

In the provided embodiment, the heat exchange surface 6 of the battery 5 and the first major surface 31 of the first exterior portion 12 are provided to include complimentary and mating corrugations 8, wherein each of the peaks associated with one of the surfaces 6, 31 is disposed to be received within one of the valleys associated with the other of the surfaces 6, 31 to ensure for maximized heat transfer between the battery 5 and the first exterior portion 12. The corrugations 8 are shown in FIG. 1 as being substantially saw-toothed in configuration with each of the corrugations 8 having a substantially triangular profile, but any type of corrugated profile may be used for forming the corrugations 8, including a profile having a square-wave shape or an undulating sinusoidal shape, as desired.

In any event, the corrugations 8 are provided to increase the amount of surface area of each of the adjoining surfaces 6, 31 facing towards each other, thereby improving the thermal conductivity of the interface therebetween. The corrugations 8 may also be provided to improve the bending stiffness of either or both of the battery 5 and the first exterior portion 12 of the cold plate assembly 10, as desired. The corrugations 8 also beneficially aid in affixing a position of the battery 5 relative to the first exterior portion 12 due to the manner in which the corrugations provide an interference pattern with respect to the direction in which the corrugations 8 are spaced from each other, thereby preventing relative movement between the battery 5 and the first exterior portion 12 as may be caused by vibrations experienced by the vehicle during operation thereof. The battery cooling assembly 1 may further include additional structures (not shown) for delimiting movement of the battery 5 relative to the cold plate assembly 10 in a direction of extension of the corrugations 8, as desired.

The corrugations 8 are shown as extending in the width direction of the cold plate assembly 10 while spaced from each other in the longitudinal direction of the cold plate assembly 10, but one skilled in the art should appreciate that the corrugations 8 may be formed to extend in the longitudinal direction of the cold plate assembly 10 while spaced from each other in the width direction of the cold plate assembly 10, as desired. Furthermore, the heat exchange surface 6 and the first major surface 31 may alternatively include the corrugations 8 extending in each of two perpendicular directions while intersecting each other to form a grid of the peaks and the valleys for further increasing the heat conducting interface present between the heat exchange surface 6 and the first major surface 31 of the first exterior portion 12, as desired.

The cold plate assembly 10 further includes a layer of a thermal interface material 9 provided between the heat exchange surface 6 of the battery 5 and the first major surface 31 of the first exterior portion 12. The thermal interface material 9 is sandwiched between the surfaces 6, 31 to include the same corrugated configuration for maximizing the thermal conductivity between the thermal interfacing material 9 and each of the surfaces 6, 31. The thermal interface material 9 may accordingly include any of the aforementioned corrugated profiles following assembly of the battery cooling assembly 1 without departing from the scope of the present invention. The thermal interface material 9 may be provided with any desired thickness in the height direction of the cold plate assembly 10, as desired, but preferably includes a thickness substantially smaller than that of the first exterior portion 12 or the battery 5. The thermal interface material 9 may be formed from any heat conductive material capable of being sandwiched between the battery 5 and the cold plate assembly 10, and may preferably be formed from a flowable or moldable material for preventing the existence of any gaps between the battery 5 and the cold plate assembly 10 to ensure for maximized heat transfer therebetween. The thermal interface material may be provided as a curable adhesive, as one non-limiting example. Any adhesive properties provided by the thermal interface material 9 may further aid in affixing the position of the battery 5 relative to the first exterior portion 12 with respect to each of the longitudinal direction, the width direction, and the height direction of the cold plate assembly 10.

Although not pictured, the heat exchange surface 6, the first major surface 31 of the first exterior portion 12, and the thermal interface material 9 may alternatively be provided to be substantially planar in configuration in the absence of the aforementioned corrugations 8, as desired, without necessarily departing from the scope of the present invention. Additionally, the heat exchange surface 6 and the first major surface 31 may alternatively be configured to mate with each other in the absence of the interceding thermal interface material 9, wherein the corresponding corrugations 8 are formed to mate in a manner wherein gaps are minimized between the battery 5 and the cold plate assembly 10.

A first flow path 21 is formed between the second major surface 32 of the first exterior portion 12 and the first major surface 33 of the separator portion 14 while a second flow path 22 is formed between the second major surface 34 of the separator portion 14 and the first major surface 35 of the second exterior portion 16. The first flow path 21 is configured to receive a first fluid flow therein while the second flow path 22 is configured to receive a second fluid flow therein. As explained in greater detail hereinafter, the first fluid flow and the second fluid flow may be provided by a first fluid and a second fluid, respectively, wherein the first fluid and the second fluid may be different fluids. Alternatively, the first fluid flow and the second fluid flow may be formed by the same fluid, wherein the same fluid may originate from different fluid systems or different locations within a single fluid system, as desired. Still, in other embodiments, the first fluid flow and the second fluid flow may originate from the same fluid that is divided into a first partial flow constituting the first fluid flow and a second partial flow constituting the second fluid flow, as desired. In each case, the cold plate assembly 10 of the present invention is characterized by the manner in which the first fluid flow and the second fluid flow pass through the respective first flow path 21 and second flow path 22 while flowing in opposing directions in order to establish a counter-flow flow configuration between the first fluid flow and the second fluid flow.

As explained in greater detail with reference to the various embodiments disclosed hereinafter, the first flow path 21 may be formed from a plurality of first flow channels 23 while the second flow path 22 may similarly be formed from a plurality of second flow channels 24. The first flow channels 23 may be formed by providing a plurality of first wall structures 25 extending in the height direction of the cold plate assembly 10 between the second major surface 32 of the first exterior portion 12 and the first major surface 33 of the separator portion 14 for further dividing the first fluid flow when traversing the first flow path 21, wherein the voids between adjacent ones of the first wall structures 25 define the first flow channels 23. Similarly, the second flow channels 24 may be formed by providing a plurality of second wall structures 26 extending in the height direction of the cold plate assembly 10 between the second major surface 34 of the separator portion 14 and the first major surface 35 of the second exterior portion 16 for further dividing the second fluid flow when traversing the second flow path 22, wherein the voids formed between adjacent ones of the second wall structures 26 define the second flow channels 24. As mentioned previously, the first flow channels 23 are arranged relative to the second flow channels 24 to allow for a counter-flow flow configuration therebetween, hence a direction of extension of each of the first flow channels 23 may be arranged to parallel to a direction of extension of at least one adjacent one of the second flow channels 24.

In some embodiments, the first exterior portion 12, the separator portion 14, and the second exterior portion 16 may be formed as parallel arranged and substantially planar plates, wherein each of the plates is independently provided before being coupled to each other, such as by welding, brazing, or the use of peripherally provided fasteners or the like. Using this configuration, the first wall structures 25 may be provided as projections extending from either of the second major surface 32 of the first exterior portion 12 or the first major surface 33 of the separator portion 14, whereas the second wall structures 26 may be provided as projections extending from either of the second major surface 34 of the separator portion 14 or the first major surface 35 of the second exterior portion 16. Alternatively, the first wall structures 25 may instead be provided by forming grooves or channels in either of the second major surface 32 of the first exterior portion 12 or the first major surface 33 of the separator portion 14 while the second wall structures 26 may be provided by forming grooves or channels in either of the second major surface 34 of the separator portion 14 or the first major surface 35 of the second exterior portion 16, wherein the grooves or channels form voids representing the first flow channels 23 and the second flow channels 24 with any surrounding material forming the wall structures 25, 26.

Accordingly, the first wall structures 25 may be formed integrally with one of the first exterior portion 12 or the separator portion 14 while the second wall structures 26 may be formed integrally with one of the separator portion 14 or the second exterior portion 16. As used herein, being integrally formed refers to the wall structures 25, 26 being formed with the corresponding portion 12, 14, 16 monolithically in the absence of any intervening seams or joints, wherein the wall structures 25, 26 may be formed with the corresponding portion 12, 14, 16 in a common manufacturing process. In the provided embodiments, the first wall structures 25 are shown as being integrally formed with the first exterior portion 12 while the second wall structures 26 are shown as being integrally formed with the second exterior portion 16. The wall structures 25, 26 may be formed in the corresponding portion 12, 14, 16 by any suitable manufacturing process, including a molding process, a stamping process, an extrusion process, a machining process, or an additive manufacturing process, as non-limiting examples.

In other embodiments, the identified portions 12, 14, 16 may all be formed integrally (monolithically) in a common manufacturing process, whereby the portions 12, 14, 16 are not in need of coupling to each other following formation thereof. The common manufacturing process may be an extrusion process, wherein the extrusion process may include the formation of voids in the cross-section of the resulting extrusion to form the first flow channels 23 and the second flow channels 24 to either side of an extruded separator portion 14 while the first exterior portion 12 and the second exterior portion 16 are disposed outwardly of the first flow channels 23 and the second flow channels 24, respectively. Alternative manufacturing processes may also be employed to integrally form the portions 12, 14, 16, including molding all three portions 12, 14, 16 from a single material with posts, columns, or the like forming a portion of the associated mold providing the voids for forming the flow channels 23, 24, providing a monolithic block of material that is subsequently drilled, milled, or otherwise machined to include voids for forming the flow channels 23, 24, or forming the portions 12, 14, 16 in an additive manufacturing process with programmed voids forming the flow channels 23, 24, as desired. One skilled in the art will appreciate that alternative manufacturing processes may be employed to produce the portions 12, 14, 16 and the flow channels 23, 24 without departing from the scope of the present invention.

The first flow channels 23 and the second flow channels 24 are shown in FIGS. 1 and 2 as extending substantially rectilinearly when passing through the cold plate assembly 10, but the first flow channels 23 and the second flow channels 24 may alternatively be provided to include corrugations (not shown) extending in the height direction of the cold plate assembly 10 with adjacent ones of the corrugations spaced from each other with respect to the longitudinal direction of the cold plate assembly 10, thereby forming the first flow channels 23 and the second flow channels 24 into undulating flow channels extending in the longitudinal direction of the cold plate assembly 10. Such undulating flow channels 23, 24 may be configured to add turbulence to the associated fluid flow in order to provide for a more homogeneous temperature thereof when exchanging heat with any adjacent ones of the portions 12, 14, 16.

The embodiment of the cold plate assembly 10 shown in FIGS. 1 and 2 includes the first fluid flow passing through the first flow path 21 while flowing in a direction from the first side 41 of the cold plate assembly 10 toward the oppositely arranged second side 42 thereof and the second fluid flow passing through the second flow path 22 while flowing in a direction from the second side 42 of the cold plate assembly 10 toward the first side 41 thereof. The first fluid flow accordingly flows in a first direction while the second fluid flow flows in a second direction parallel to and opposite the first direction.

The first flow path 21 is formed by a plurality of the first flow channels 23 with each of the first flow channels 23 spaced from each other with respect to the width direction of the cold plate assembly 10 while extending longitudinally parallel to the longitudinal direction of the cold plate assembly 10. Similarly, the second flow path 22 is formed by a plurality of the second flow channels 24 with each of the second flow channels 24 also spaced from each other with respect to the width direction of the cold plate assembly 10 while also extending longitudinally parallel to the longitudinal direction of the cold plate assembly 10. Each of the first flow channels 23 and each of the second flow channels 24 are shown in FIG. 2 as including the same rectangular cross-sectional shape and size, but the first flow channels 23 and the second flow channels 24 may include variable sizes and shapes without necessarily departing from the scope of the present invention. For example, the flow channels 23, 24 may alternatively be formed to include a triangular shape, a rounded rectangular shape, a hexagonal shape, or an elliptical shape, as non-limiting examples. Each of the first flow channels 23 is further shown as being in alignment with a corresponding one of the second flow channels 24 with respect to the width direction of the cold plate assembly 10, but the first flow channels 23 may alternatively be offset from the second flow channels 24 with respect to the width direction of the cold plate assembly 10 without departing from the scope of the present invention, as desired. A height of one or more of the flow channels 23, 24 may also vary from the height of one or more of the other flow channels 23, 24 to further form an offset in the height direction of the cold plate assembly 10 between adjacent ones of the flow channels 23, 24, as desired.

Although the first flow path 21 and the second flow path 22 are shown as including the corresponding flow channels 23, 24, it should also be understood that the flow paths 21, 22 may be provided in the absence of further flow divisions while maintaining the disclosed counter-flow flow configuration of the cold plate assembly 10, as desired.

The first flow path 21 extends from a first inlet manifold 51 formed adjacent the first side 41 of the cold plate assembly 10 to a first outlet manifold 52 formed adjacent the second side 42 of the cold plate assembly 10. The second flow path 22 similarly extends from a second inlet manifold 61 formed adjacent the second side 42 of the cold plate assembly 10 to a second outlet manifold 62 formed adjacent the first side 41 of the cold plate assembly 10. Each of the manifolds 51, 52, 61, 62 may extend across an entirety of the width of the cold plate assembly 10 with portions of the inwardly projecting wall structures defining the outer perimeter sides 41, 42, 43, 44 of the cold plate assembly 10 delimiting the flow of the first fluid flow and the second fluid flow. However, the identified manifolds 51, 52, 61, 62 may include any configuration suitable for distributing or recombining either of the first fluid flow or the second fluid flow through the associated flow channels 23, 24, as desired. The separator portion 14 forms a separation between the first inlet manifold 51 and the second outlet manifold 62 adjacent the first side 41 of the cold plate assembly 10 as well as the first outlet manifold 52 and the second inlet manifold 61 adjacent the second side 42 of the cold plate assembly 10. The embodiment of the cold plate assembly 10 shown in FIGS. 1 and 2 accordingly includes a separation between the first fluid flow and the second fluid flow throughout the cold plate assembly 10 with the separator portion 14 providing the separation.

The first inlet manifold 51 distributes the first fluid flow to an inlet end of each of the first flow channels 23 while the first outlet manifold 52 receives and recombines the first fluid flow when exiting an outlet end of each of the first flow channels 23. Similarly, second inlet manifold 61 distributes the second fluid flow to an inlet end of each of the second flow channels 24 while the second outlet manifold 62 receives and recombines the second fluid flow when exiting an outlet end of each of the second flow channels 24.

The first inlet manifold 51 is associated with and in fluid communication with a first inlet port 53 while the first outlet manifold 52 is associated with and in fluid communication with a first outlet port 54. Similarly, the second inlet manifold 61 is associated with and in fluid communication with a second inlet port 63 while the second outlet manifold 62 is associated with and in fluid communication with a second outlet port 64. Each of the ports 53, 54, 63, 64 is shown as a cylindrical conduit penetrating one of the exterior portions 12, 16, but it should be understood that the ports 53, 54, 63, 64 may be provided in alternative shapes and configurations or may penetrate any of the sides 41, 42, 43, 44 of the cold plate assembly 10 without departing from the scope of the present invention, so long as each of the ports 53, 54, 55, 56 is associated with the aforementioned one of the manifolds 51, 52, 61, 62 for achieving the disclosed counter-flow flow configuration. The ports 53, 54, 63, 64 are configured to convey the working fluids associated with operation of the battery cooling assembly 1 to and from the cold plate assembly 10.

The ports 53, 54, 63, 64 may accordingly be in fluid communication with any fluid systems or fluid circuits associated with operation of the vehicle or with the cooling of the battery 5, as desired. For example, in some embodiments each of the ports 53, 54, 63, 64 may be associated with a common fluid circuit or system conveying a single fluid therethrough. The associated fluid circuit or system may include a first external fluid line (not shown) extending between the second outlet port 64 and the first inlet port 53 as well as a second external fluid line (not shown) extending between the first outlet port 54 and the second inlet port 63. The first external fluid line and the second external fluid line may each include one or more components in fluid communication with the single fluid for altering at least one of a temperature, pressure, phase, or flow rate of the single fluid.

As one non-limiting example, the fluid circuit or system may be a coolant circuit or system conveying a coolant for selectively cooling the battery 5. The coolant may be provided primarily in liquid form, and may comprise water, glycol, or mixtures thereof, as non-limiting examples. The coolant may alternatively be provided in gaseous form or a mixed liquid and gaseous form without necessarily departing from the scope of the present invention. The coolant circuit or system may also be associated with cooling additional components of the vehicle such as an inverter, electric motor, or other heat generating components associated with operation of the vehicle, as desired. The coolant circuit or system may also include additional heat exchangers (not shown) for transferring heat to or from the coolant, such as a radiator configured to release the heat removed from the battery 5 to the ambient air or a heating heat exchanger configured to release the heat removed from the battery 5 to the air delivered to a passenger compartment of the vehicle. The coolant circuit or system may also include one or more pumps (not shown) for causing the coolant to circulate through the coolant circuit or system. If multiple pumps are used, one of the pumps may be disposed along the first external fluid line while the other of the pumps may be disposed along the second external fluid line. The pump or pumps may be configured to vary the flow rate of the coolant through the coolant circuit or system, and especially the cold plate assembly 10, in order to vary the rate of the heat removal from the battery 5 as well as other factors such as the turbulence experienced by the coolant when passing through the cold plate assembly 10.

As an additional non-limiting example, the single fluid circulated by the fluid circuit or system may be a refrigerant circulated through a refrigerant circuit of a heating, ventilating, and air conditioning (HVAC) system of the vehicle. The refrigerant circuit may include a compressor (not shown), a condenser (not shown), at least one expansion member (not shown), and an evaporator (not shown), among other components common to such refrigerant circuits.

The cold plate assembly 10 may be positioned relative to the remainder of the refrigerant circuit in a manner ensuring that the refrigerant is at a minimized temperature for removing a maximized amount of heat from the battery 5 when entering the cold plate assembly 10 through one of the inlet ports 53, 63. For example, the refrigerant may be passed through the condenser of the refrigerant circuit for cooling the refrigerant as well as at least one expansion member for lowering the pressure of the refrigerant and further cooling the refrigerant immediately prior to the refrigerant entering either of the disclosed inlet ports 53, 63. The refrigerant circuit may alternatively include one of the expansion members disposed along each of the associated external fluid lines such that the refrigerant enters each of inlet ports 53, 63 when in a low temperature, low pressure state. Specifically, the refrigerant circuit may include the refrigerant passing in order through a first expansion member, the first flow path 21, a second expansion member, and the second flow path 22. The refrigerant may instead pass in order through a first expansion member, the second flow path 21, a second expansion member, and the first flow path 21, as desired. Each associated expansion member may further be configured to include a variable cross-section for selectively varying the pressure (and hence the temperature) of the refrigerant before entering either of the inlet ports 53, 63. The refrigerant may accordingly be provided to one or both of the flow paths 21, 22 when primarily in a low temperature and gaseous state, as desired. The compressor of the refrigerant circuit may also be operated variably to further control the temperature, pressure, and flow rate of the refrigerant when passing through the cold plate assembly 10, as desired.

In other embodiments, the first flow path 21 may be passed by a first fluid while the second flow path 22 may be passed by a second fluid different from the first fluid. Such an arrangement may include the first external fluid line extending between the first outlet port 54 and the first inlet port 53 and the second external line extending between the second outlet port 64 and the second inlet port 63, thereby providing two independent fluid circuits or systems in heat exchange relationship with each other through the cold plate assembly 10, but not in direct fluid communication with each other within the cold plate assembly 10. The first fluid may be either of the coolant or the refrigerant described hereinabove while the second fluid may be the other of the coolant or the refrigerant. Alternatively, the first fluid may be a first coolant while the second fluid may be a second coolant, wherein each of the coolants is associated with a different independently provided coolant system of the vehicle. The associated coolant circuits and/or refrigerant circuits may include any of the components described hereinabove while also positioning each of the inlet ports 53, 63 of the cold plate assembly 10 at a suitable position for receiving the associated fluid at a desired temperature, pressure, and flow rate.

In use, the first fluid flow enters the cold plate assembly 10 through the first inlet port 53 and is distributed to the inlet end of each of the first flow channels 23 within the first inlet manifold 51. The first fluid flow traverses each of the first flow channels 23 before being recombined within the first outlet manifold 52, whereby the first fluid flow then exits the cold plate assembly 10 through the first outlet port 54. Simultaneously, the second fluid flow enters the cold plate assembly 10 through the second inlet port 63 and is distributed to the inlet end of each of the second flow channels 24 within the second inlet manifold 61. The second fluid flow traverses each of the second flow channels 24 before being recombined within the second outlet manifold 62, whereby the second fluid flow then exits the cold plate assembly 10 through the second outlet port 64. The first fluid flow and the second fluid flow pass adjacent each other in opposing directions while separated by the separator portion 14, thereby forming the aforementioned counter-flow flow configuration between the first fluid flow and the second fluid flow. The first fluid flow and the second fluid flow exchange heat with each of the portions 12, 14, 16 of the cold plate assembly 10 in order to remove heat from the battery 5 that has been transferred to the first exterior portion 12 via the thermal interface material 9.

The disclosed configuration provides numerous advantages over the cold plate assemblies of the prior art. It has been surprisingly discovered that the use of the counter-flow flow configuration between the first fluid flow and the second fluid flow promotes for greater heat exchange efficiency and a more uniform temperature distribution within the cold plate assembly 10 in comparison to the use of a single flow path or the use of two flow paths having a parallel-flow flow configuration. The manner in which the two different fluid flows may be provided at different temperatures, pressure levels, phases, and flow rates also allows for the efficiency and uniformity of the heat transfer from the battery 5 to the cold plate assembly 10 be customized for a variety of different applications or conditions. Additionally, the disclosed use of the corrugations 8 as well as the thermal interface material 9 further increases the heat flux from the battery 5 to the cold plate assembly 10 while also establishing a fixed position of the battery 5 relative to the cold plate assembly 10.

The battery cooling assembly 1 is disclosed herein as including a single battery 5 associated with a single cold plate assembly 10, but one skilled in the art should readily appreciate that a plurality of the batteries 5 may be in contact with one of the cold plate assemblies 10 or that a plurality of the cold plate assemblies 10 may be in contact with a single battery 5, as desired. Furthermore, it should also be appreciated that the vehicle may include an array of the batteries 5 with each of the batteries 5 associated with one of the cold plate assemblies 10. For example, the first fluid flow of each of the cold plate assemblies 10 may originate from a common first fluid source (manifold) for causing the associated working fluid to flow in parallel through each of the associated first flow paths 21 while the second fluid flow of each of the cold plate assemblies 10 may similarly originate from a common second fluid source (manifold) for causing the associated working fluid to flow in parallel through each of the associated second flow paths 22. The aforementioned parallel flow arrangement (as opposed to a series flow arrangement) may accordingly ensure that each of the associated cold plate assemblies 10 includes a substantially similar heat transfer efficiency and uniformity by introducing each of the fluid flows while having similar characteristics. However, it is conceivable that two or more of the cold plate assemblies 10 may instead be arranged in series, as desired.

Figure 3:
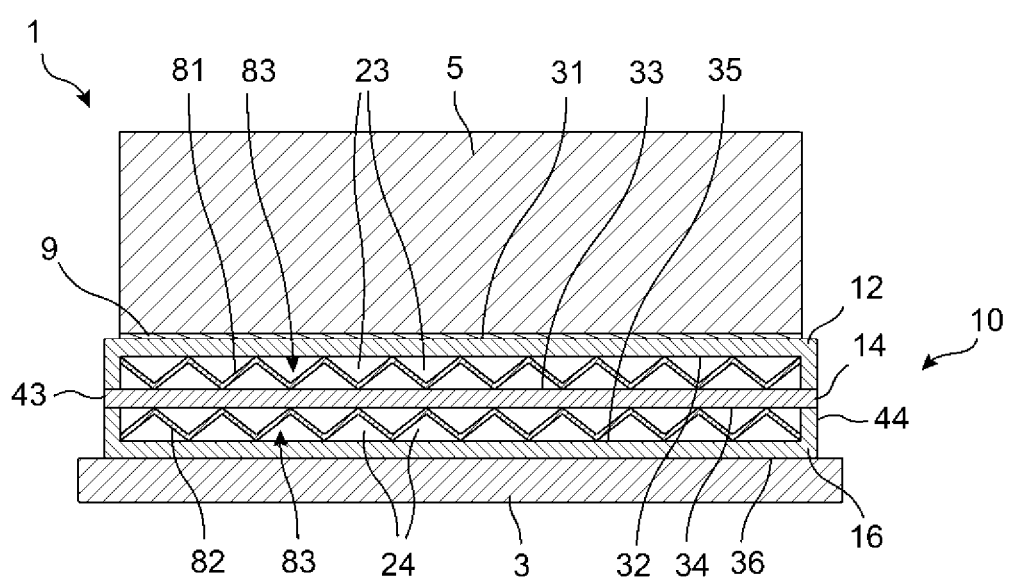
FIG. 3 is a cross-sectional elevational view taken through a center of a battery cooling assembly including a pair of fin structures for subdividing a pair of flow paths formed within the battery cooling assembly.

Referring now to FIG. 3, other embodiments of the cold plate assembly 10 may additionally include a first fin structure 81 disposed between the first exterior portion 12 and the separator portion 14 and a second fin structure 82 disposed between the separator portion 14 and the second exterior portion 16, wherein the first fin structure 81 and the second fin structure 82 are provided independently of the disclosed portions 12, 14, 16. The first fin structure 81 may be formed by any structure or plurality of structures extending between and separating the first exterior portion 12 from the separator portion 14 while the second fin structure 82 may be formed by any structure or plurality of structures extending between and separating the separator portion 14 and the second exterior portion 16. The fin structures 81, 82 may accordingly replace the aforementioned first and second wall structures 25, 26 for performing functions such as dividing the first and second flow paths 21, 22 into the first and second flow channels 23, 24 and stiffening the cold plate assembly 10 from bending away from a plane defined by the longitudinal and width directions of the cold plate assembly 10. The first and second fin structures 81, 82 may also be disposed at locations forming the sides 41, 42, 43, 44 of the cold plate assembly 10 for delimiting any outward flow of any associated working fluid. The first and second fin structures 81, 82 may be securely coupled to the adjoining portions 12, 14, 16 of the cold plate assembly 10 by an aggressive metal joining method, such as welding or brazing, as desired.

In the embodiment illustrated in FIG. 3, each of the fin structures 81, 82 is provided with longitudinally extending corrugations 83 with the spaces formed between adjacent ones of the corrugations 83 forming the first and second flow channels 23, 24, respectively. The corrugations 83 are shown as being substantially saw-toothed in configuration, but the corrugations 83 may alternatively be provided with any corrugated shape including a sinusoidal wave shape or a square wave shape for forming the adjacent ones of the first and second flow channels 23, 24, as desired. The first and second fin structures 81, 82 may alternatively be provided as a plurality of independently provided and longitudinally extending wall structures used to divide the first and second flow paths 21, 22 into the first and second flow channels 23, 24, as desired. More specifically, the first and second fin structures 81, 82 may be provided to include any of the configurations shown herein with respect to any of the illustrated wall structures 25, 26 without departing from the scope of the present invention.

Figure 4:
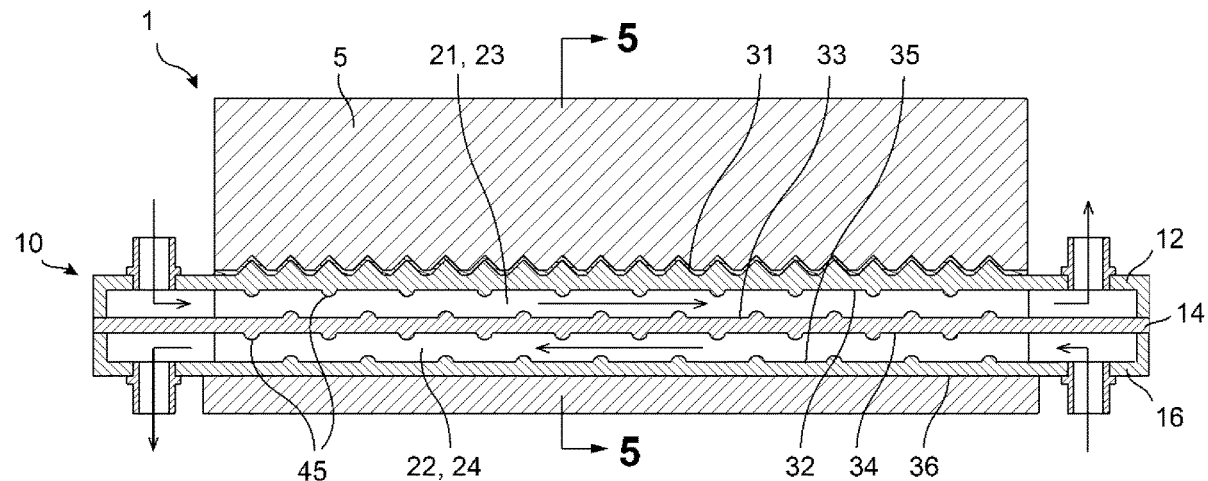
FIG. 4 is a cross-sectional elevational view of a battery cooling assembly having projections extending into each of a pair of flow paths formed within the battery cooling assembly.
Figure 5:
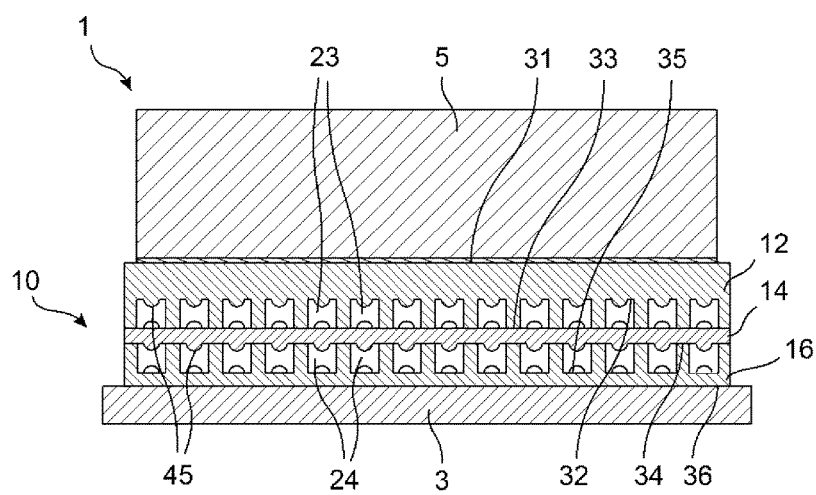
FIG. 5 is a cross-sectional elevational view of the battery cooling assembly of FIG. 4 as taken through section lines 5-5 of FIG. 4.

FIGS. 4 and 5 illustrate another slight variation to the cold plate assembly 10 wherein the second major surface 32 of the first exterior portion 12, the first major surface 33 of the separator portion 14, the second major surface 34 of the separator portion 14, and the first major surface 35 of the second exterior portion 16 each includes a plurality of projections 45 projecting in the height direction of the cold plate assembly 10 and into one of the flow paths 21, 22. More specifically, each of the flow channels 23, 24 includes an alternating pattern of the projections 45 projecting in opposing directions toward and away from the battery 5 when progressing in the longitudinal direction of the cold plate assembly 10. However, the projections may alternatively be provided on any combination of the major surfaces 32, 33, 34, 35 with any spacing and pattern while remaining within the scope of the present invention.

The projections 45 extend only partially between the adjacent surfaces 32, 33, 34, 35 in a manner wherein the projections 45 do not further divide either of the fluid flows, but instead provide additional turbulence to each of the fluid flows for further mixing each of the fluid flows, which in turn promotes increased and more uniform heat transfer within each of the flow paths 21, 22. The projections 45 may additionally be provided to further stiffen each corresponding one of the portions 12, 14, 16, as desired. The projections 45 are shown as having a substantially semi-spherical shape, but the projections 45 may have any perimeter shape and any profile shape without departing from the scope of the present invention. The projections 45 may be formed in the selected portion 12, 14, 16 during the same manufacturing process used to from the wall structures 25, 26, as desired.

FIGS. 6-10 illustrate cold plate assemblies 110, 210, 310, 410 according to alternative embodiments of the present invention. Components and features of the cold plate assemblies 110, 210, 310, 410 that are similar to those shown and described with reference to the cold plate assembly 10 are shown and described as including the same reference numerals as the cold plate assembly 10, whereas significant deviations in structure are described herein and are denoted by the use of newly introduced reference numerals.

Figure 6:
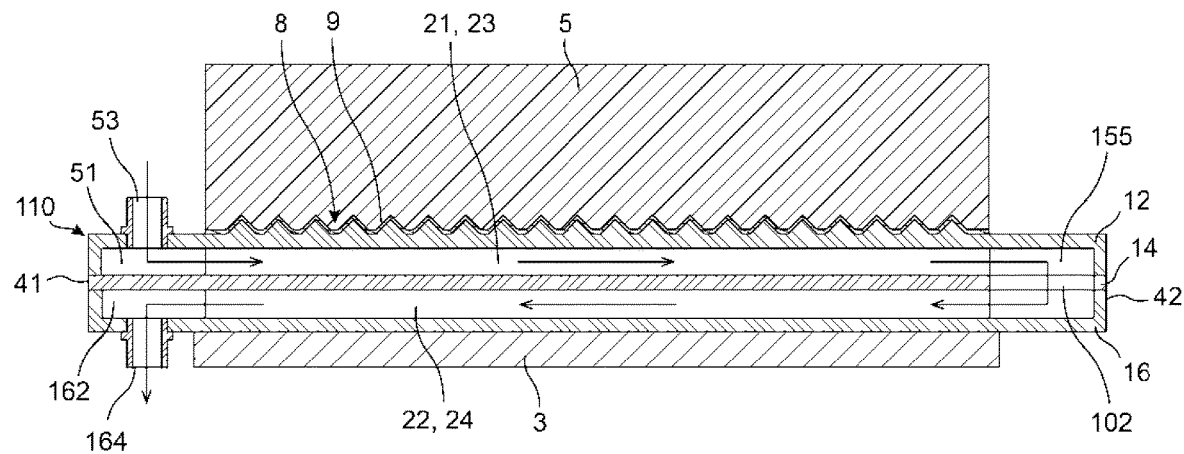
FIG. 6 is a cross-sectional elevational view of a battery cooling assembly according to another embodiment of the present invention, wherein a counter-flow flow configuration is present between a first fluid flow and a second fluid flow formed by a common fluid.

The cold plate assembly 110 shown in FIG. 6 includes the use of only a single fluid for exchanging heat with the associated battery 5, wherein the single fluid may be any of the fluids described hereinabove as forming one or both of the first fluid flow and the second fluid flow with reference to the cold plate assembly 10. The cold plate assembly 110 includes the first inlet port 53 as well as a repositioned first outlet port 164, each of which are disposed adjacent the first side 41 of the cold plate assembly 110. The separator portion 14 is also disclosed as including an opening 102 formed therein adjacent the second side 42 of the cold plate assembly 110 to allow for the first fluid flow passing through the first flow path 21 (which may be comprised by the first flow channels 23) to be fluidly communicated to the second flow path 22 (which may be comprised by the second flow channels 24) via a flow path formed within the cold plate assembly 110, as opposed to flowing through an external fluid line before returning to the cold plate assembly 110. The fluid communication between the first fluid flow and the second fluid flow may alternatively be provided by shortening the longitudinal length of the separator portion 14 with the peripheral wall structures of the exterior portions 12, 16 extended in the height direction of the cold plate assembly 110 to delimit the flow of the associated fluid, as desired. The cold plate assembly 110 accordingly includes the first inlet manifold 51 adjacent the first side 41 and in fluid communication with the first inlet port 53, a turnaround manifold 155 adjacent the second side 42 for changing the direction of the associated fluid between the first flow path 21 and the second flow path 22, and a first outlet manifold 162 disposed adjacent the first side 41 and in fluid communication with the first outlet port 164.

In use, the single fluid enters the cold plate assembly 110 through the first inlet port 53, is distributed to the first flow path 21 via the inlet manifold 51, is caused to change flow directions within the turnaround manifold 155 before being distributed to the second flow path 22, and then exits the cold plate assembly 110 through the first outlet manifold 162 and the associated first outlet port 164. The single fluid accordingly undergoes the counter-flow flow configuration while entering and exiting the cold plate assembly 110 from a common side 41 of the cold plate assembly 110, which may beneficially allow for the cold plate assembly 110 to be more easily packaged relative to adjacent components of the vehicle.

Figure 7:
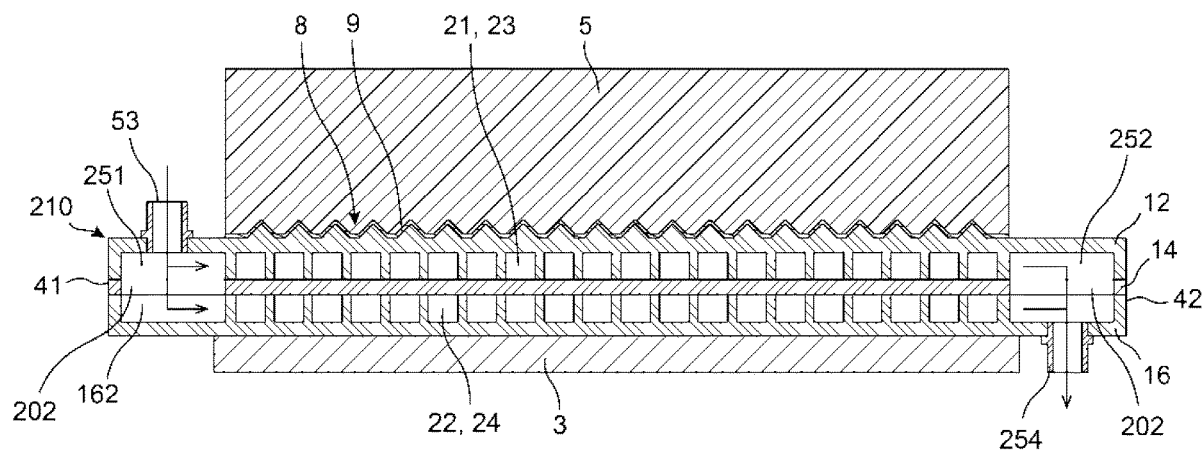
FIG. 7 is a cross-sectional elevational view of a battery cooling assembly according to another embodiment of the invention, wherein a counter-flow flow configuration is present between a first fluid flow and a second fluid flow with the fluid flows originating from a common fluid source.
Figure 8:
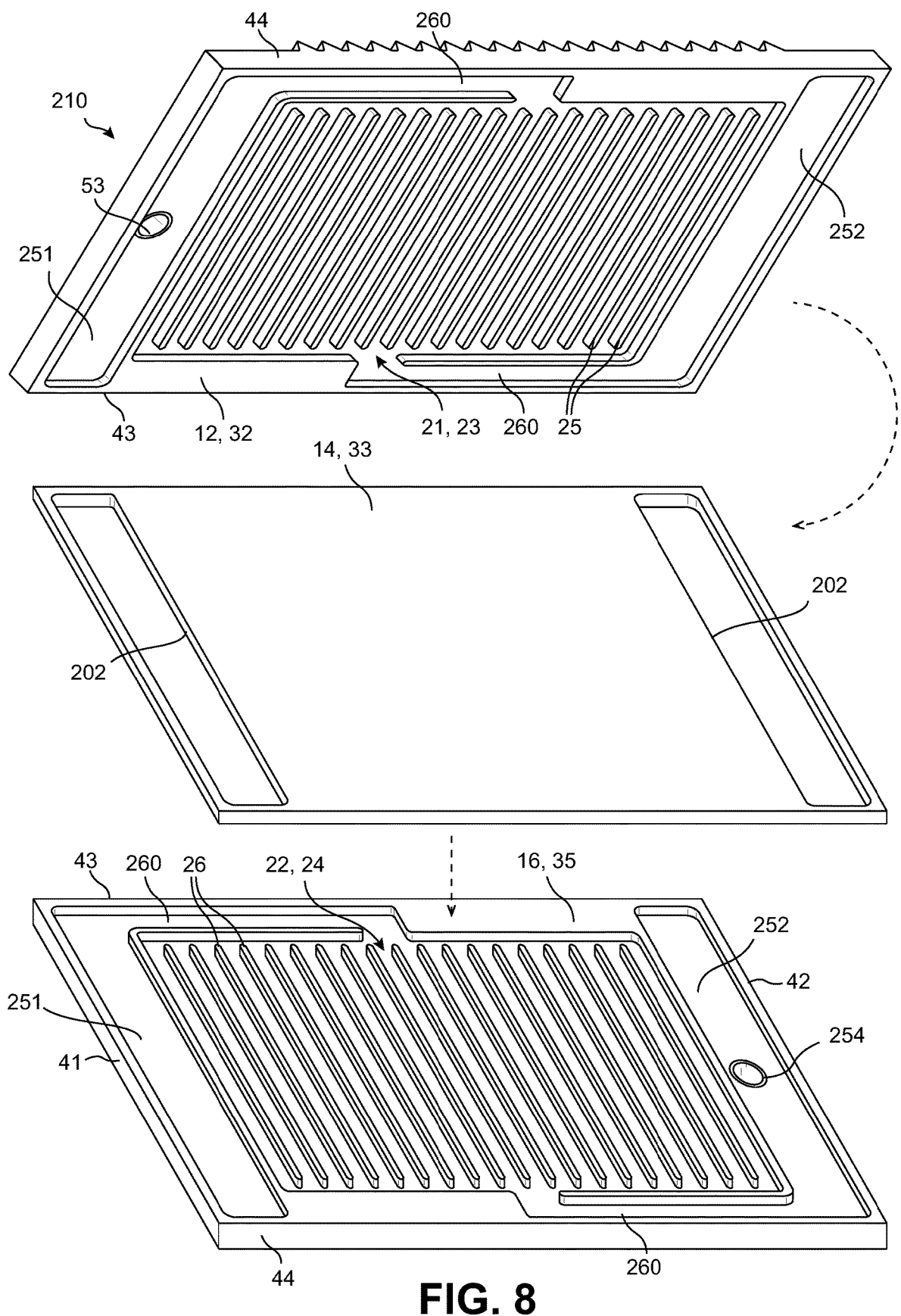
FIG. 8 is an exploded perspective view of three distinct plates cooperating to form the battery cooling assembly of FIG. 7.

The cold plate assembly 210 illustrated in FIGS. 7 and 8 similarly includes the use of only a single fluid for exchanging heat with the associated battery 5, wherein the single fluid may again be any of the fluids described herein as being suitable for use with the cold plate assembly 10. The cold plate assembly 210 includes a first inlet manifold 251 adjacent the first side 41 thereof and a first outlet manifold 252 adjacent the second side 42 thereof. The separator portion 14 includes a pair of openings 202 formed therein, wherein a first one of the openings 202 adjacent the first side 41 opens the first inlet manifold 251 to be in fluid communication with each of the first flow path 21 and the second flow path 22 at inlet ends thereof and wherein a second one of the openings 202 adjacent the second side 42 opens the first outlet manifold 254 to be in fluid communication with each of the first flow path 21 and the second flow path 22 at outlet ends thereof. As mentioned above, the separator portion 14 may alternatively be shortened in the longitudinal direction of the cold plate assembly 210 while the adjacent exterior portions 12, 16 may be extended in the height direction to accommodate the resulting gap, as desired. The first inlet manifold 251 receives the associated fluid from the first inlet port 53 while the first outlet manifold 252 expels the fluid from the cold plate assembly 210 through a first outlet port 254.

As shown in FIG. 8, the first exterior portion 12 and the second exterior portion 16 each include lateral flow connectors 260 used to route the fluid from the first inlet manifold 251 to one of the associated fluid flow paths 21, 22 and then from the associated one of the fluid flow paths 21, 22 to the first outlet manifold 252. The lateral flow connectors 260 each extend in a direction between the first side 41 and the second side 42 of the cold plate assembly 210 while disposed adjacent one of the lateral sides 43, 44 of the cold plate assembly 210. As is apparent from review of FIG. 8, the directing of the fluid through the lateral flow connectors 260 allows for the first fluid flow and the second fluid flow to experience the counter-flow flow configuration within the first and second flow paths 21, 22 while flowing in a direction perpendicular to the direction the first side 41 is spaced from the second side 42 of the cold plate assembly 210, in contrast to each of the configurations shown in FIGS. 1-6. The cold plate assembly 210 accordingly allows for the single fluid to be placed in the counter-flow flow configuration with each of the fluid flows having substantially the same initial characteristics due to each of the fluid flows originating from a common source within the cold plate assembly 210 as formed by the first inlet manifold 251, which is also in contrast to each of the configurations shown in FIGS. 1-6.

Figure 9:
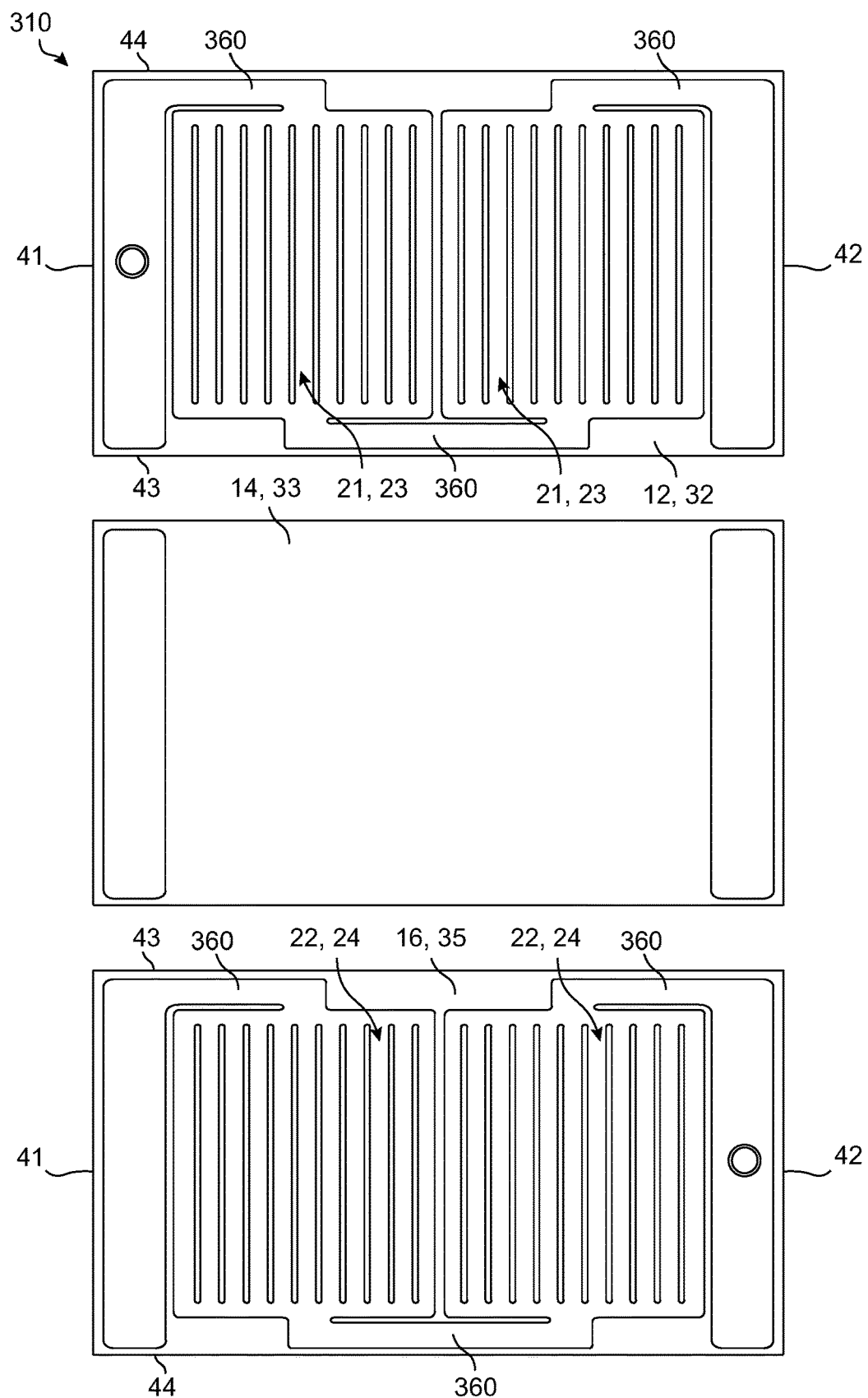
FIG. 9 is a top plan view of each of three distinct plates cooperating to form a cold plate assembly of a battery cooling assembly according to another embodiment of the invention, wherein the battery cooling assembly includes multiple instances of a first fluid flow and a second fluid flow encountering a counter-flow flow configuration.

FIG. 9 illustrates the portions 12, 14, 16 of a cold plate assembly 310 that is substantially identical to the cold plate assembly 210 with the exception that the cold plate assembly 310 includes three lateral flow connectors 360 associated with each of the exterior portions 12, 16, which in turn allows for the single fluid to experience an additional reversal of direction when flowing through each of the associated flow paths 21, 22, which in turn leads to each of the fluid flows passing by each other twice while experiencing the counter-flow flow configuration. This flow arrangement may be repeated as many times as necessary to further increase the number of the changes in direction of the fluid and the number of times the fluid experiences one of the counter-flow flow configurations. However, the repeated changes in flow direction may lead to an undesired drop in the pressure of the associated fluid, so the cold plate assembly 210 may be better suited to use with a fluid in a liquid form, as the liquid form of the fluid is less likely to stagnate within one of the flow paths 21, 22. However, any fluid in any condition may be used with the cold plate assembly 310 without departing from the scope of the present invention.

Figure 10:
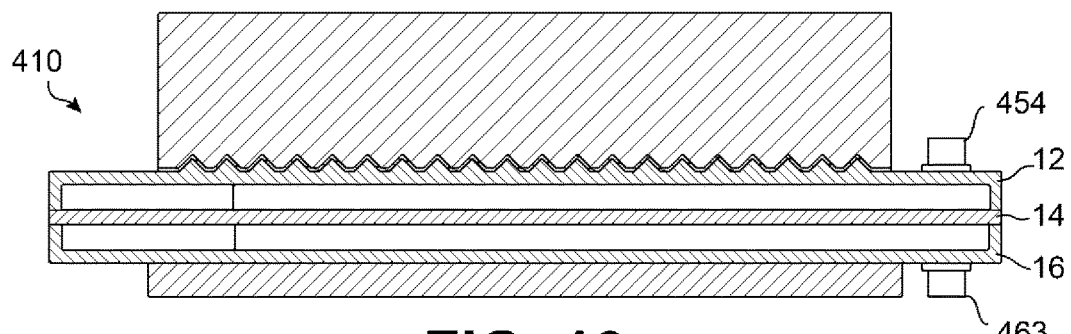
FIG. 10 is a cross-sectional elevational view of a battery cooling assembly according to another embodiment of the invention, wherein a first fluid flow and a second fluid flow experience a counter-flow flow configuration when traversing a pair of serpentine flow paths.

FIG. 10 illustrates a cold plate assembly 410 configured for utilizing two different fluids or the same fluid at two different locations within an associated fluid circuit or system in similar fashion to the cold plate assembly 10 of FIGS. 1 and 2 while also allowing for each of the fluid flows to pass by each other after reversing directions multiple times in similar fashion to the cold plate assembly 310 of FIG. 9. The different fluids or the same fluid at two different locations may be formed by any of the fluids disclosed in reference to the cold plate assembly 10, as desired.

Figure 11:
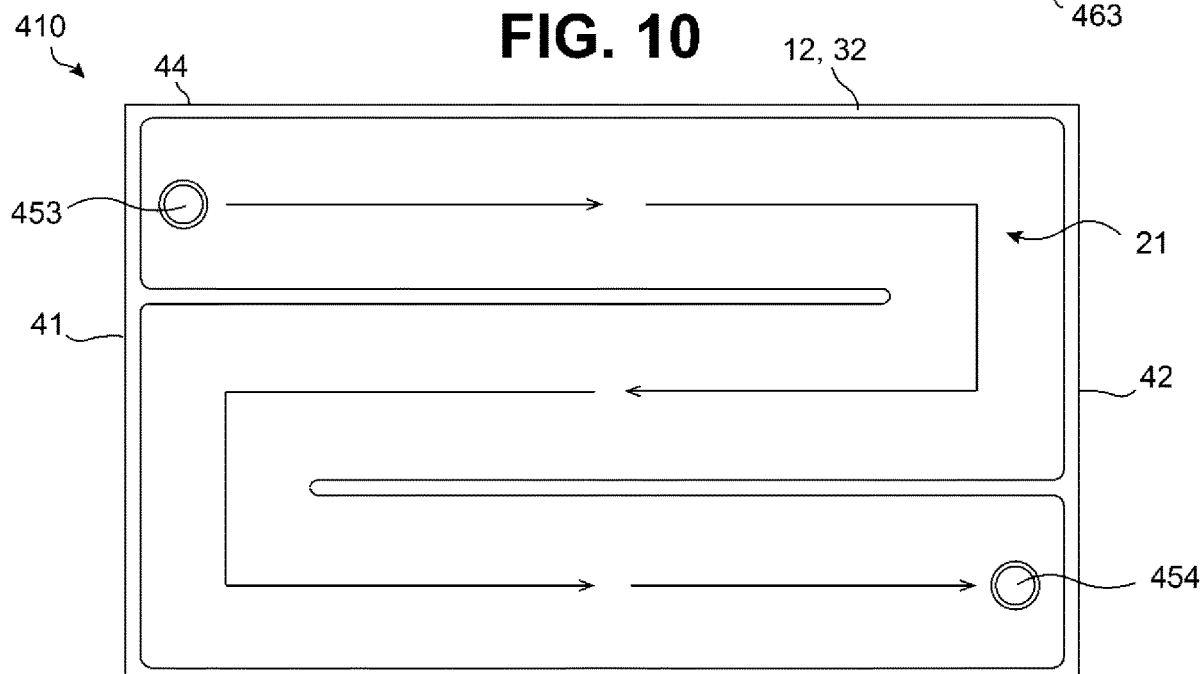
FIG. 11 is a top plan view of a pair of plates forming a portion of the battery cooling assembly of FIG. 10.
Figure 11:
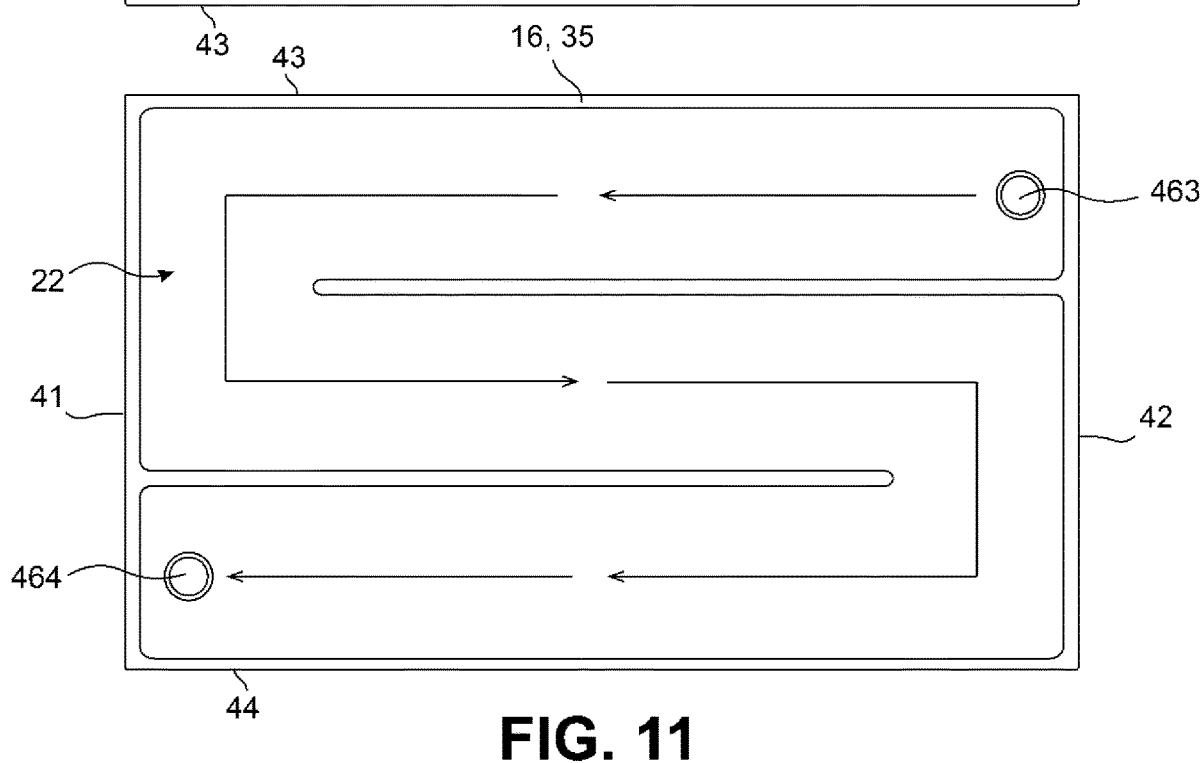

As shown in FIG. 10, the separator portion 14 extends between the first exterior portion 12 and the second exterior portion 16 along an entirety of the cold plate assembly 410 to ensure that the first fluid flow and the second fluid flow are isolated from each other within the cold plate assembly 410. As best shown in FIG. 11, the first exterior portion 12 of the cold plate assembly 410 includes the first flow path 21 thereof extending from a first inlet port 453 to a first outlet port 454 while the second exterior portion 16 of the cold plate assembly 410 includes the second flow path 22 thereof extending from a second inlet port 463 to a second outlet port 464. When the first exterior portion 12 is flipped from the orientation of FIG. 11 the inlet ports 453, 463 are disposed at opposite corners of the cold plate assembly 410 while the outlet ports 454, 464 are similarly disposed at opposite corners of the cold plate assembly 410.

The first wall structures 25 of the first exterior portion 12 and the second wall structures 26 of the second exterior portion 16 are each provided to form a substantially S-shaped flow configuration through each of the associated flow paths 21, 22. The substantially S-shaped configuration of each of the flow paths 21, 22 and the disposition of the inlet ports 453, 463 and the outlet ports 454, 464 at opposing corners of the cold plate assembly 410 leads to each of the fluid flows continuously maintaining the counter-flow flow configuration even as the associated fluid flows change directions multiple times while passing through each of the flow paths 21, 22. It should also be understood that the disclosed S-shaped configurations of the flow paths 21, 22 may be further repeated multiple times to increase the number of times the fluids change direction while maintaining the counter-flow flow configuration.

Although not shown in FIG. 11, the first flow path 21 and the second flow path 22 may additionally include any associated wall structures 25, 26 for further forming individual flow channels 23, 24 along any of the different legs of the S-shaped flow configuration without departing from the scope of the present invention. Additionally, the flow paths 21, 22 may further include any pattern of the previously disclosed projections 45 for further increasing the turbulence of the associated fluid flow. The wall structures 25, 26 and/or projections 45 may also be added to the cold plate assembly 410 to further stiffen the cold plate assembly 410, as desired.

Each of the cold plate assemblies 10, 110, 210, 310, 410 disclosed herein accordingly improves the ability to transfer heat from the associated battery 5 by means of the use of each of the disclosed counter-flow flow configurations while also improving the heat exchange uniformity throughout each of the cold plate assemblies 10, 110, 210, 310, 410.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cold plate assembly for cooling a battery of a vehicle, the cold plate assembly comprising:
a first exterior portion disposed adjacent the battery;
a separator portion disposed adjacent the first exterior portion;
a first flow path formed between the first exterior portion and the separator portion, the first flow path configured to receive a first fluid flow therein;
a second exterior portion disposed adjacent the separator portion opposite the first exterior portion; and
a second flow path formed between the separator portion and the second exterior portion, the second flow path configured to receive a second fluid flow therein, wherein the first fluid flow flows relative to the second fluid flow in a counter-flow flow configuration, wherein the first fluid flow and the second fluid flow each enter the cold plate assembly adjacent a first side thereof, and wherein the first fluid flow and the second fluid flow each exit the cold plate assembly adjacent a second side thereof arranged opposite the first side thereof, and wherein the first side of the cold plate assembly is spaced from the second side of the cold plate assembly in a first direction, and wherein the counter-flow flow configuration includes the first fluid flow flowing in a second direction perpendicular to the first direction and the second fluid flow flowing in a third direction perpendicular to the first direction and opposite the second direction.

2. The cold plate assembly of claim 1, wherein the battery includes a heat exchange surface facing towards a first major surface of the first exterior portion, and wherein corrugations formed in the heat exchange surface of the battery are configured to mate with corrugations formed in the first major surface of the first exterior portion.

3. The cold plate assembly of claim 2, further comprising a thermal interface material disposed between the corrugations of the heat exchange surface of the battery and the corrugations of the first major surface of the first exterior portion.

4. The cold plate assembly of claim 1, wherein the first flow path is divided into a plurality of first flow channels and the second flow path is divided into a plurality of second flow channels.

5. The cold plate assembly of claim 4, wherein a plurality of first wall structures extend between the first exterior portion and the separator portion with each of the first wall structures partially defining one of the first flow channels, and wherein a plurality of second wall structures extend between the separator portion and the second exterior portion with each of the second wall structures partially defining one of the second flow channels.

6. The cold plate assembly of claim 4, wherein the first flow channels and the second flow channels extend longitudinally in parallel.

7. The cold plate assembly of claim 1, wherein at least one of the first flow path and the second flow path includes a projection for increasing the turbulence of at least one of the first fluid flow or the second fluid flow.

8. The cold plate assembly of claim 1, wherein the first fluid flow and the second fluid flow are formed by a same fluid.

9. The cold plate assembly of claim 8, wherein the same fluid is one of a coolant or a refrigerant associated with an HVAC system of the vehicle.

10. The cold plate assembly of claim 1, wherein the counter-flow configuration flow configuration further includes the first fluid flow changing direction to flow in the third direction and the second fluid flow changing direction to flow in the second direction.

11. The cold plate assembly of claim 1, wherein the first exterior portion, the separator portion, and the second exterior portion are each formed by parallel arranged and substantially planar plates.

12. The cold plate assembly of claim 1, wherein the first exterior portion, the separator portion, and the second exterior portion are formed integrally in an extrusion process.

13. The cold plate assembly of claim 1, wherein a fin structure is disposed between one of the first exterior portion and the separator portion or the separator portion and the second exterior portion.

14. The cold plate assembly of claim 1, wherein the first flow path and the second flow path are each in fluid communication with a first inlet port disposed adjacent a first side of the cold plate assembly and a first outlet port disposed adjacent a second side of the cold plate assembly arranged opposite the first side.

* * * * *